United States Patent
Onishi

(10) Patent No.: US 11,761,911 B2
(45) Date of Patent: Sep. 19, 2023

(54) PHANTOM FOR EVALUATING CT DEVICE

(71) Applicant: Shimadzu Corporation, Kyoto (JP)

(72) Inventor: Shuhei Onishi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 17/686,521

(22) Filed: Mar. 4, 2022

(65) Prior Publication Data
US 2022/0334070 A1    Oct. 20, 2022

(30) Foreign Application Priority Data

Apr. 16, 2021 (JP) ................................. 2021-069703

(51) Int. Cl.
*G01N 23/046* (2018.01)
*G01N 23/083* (2018.01)

(52) U.S. Cl.
CPC ......... *G01N 23/046* (2013.01); *G01N 23/083* (2013.01); *G01N 2223/04* (2013.01); *G01N 2223/3035* (2013.01); *G01N 2223/419* (2013.01)

(58) Field of Classification Search
CPC .............. G01N 23/046; G01N 23/083; G01N 2223/04; G01N 2223/3035; G01N 2223/419; G01B 15/04
See application file for complete search history.

(56) References Cited

U.S. PATENT DOCUMENTS 9,146,327 B2 *    9/2015   Suppes ................... G01T 7/005
2020/0232938 A1 * 7/2020   Fitzgerald ............. G06T 7/0004
2021/0282734 A1   9/2021   Kishi et al.

FOREIGN PATENT DOCUMENTS

| CN | 111053567 A | * | 4/2020 |
| CN | 111053567 A | | 4/2020 |
| WO | 2018193800 A1 | | 10/2018 |

OTHER PUBLICATIONS

Translation of CN111053567A (Year: 2020).*
Extended European Search Report dated Aug. 3, 2022 in corresponding EP Application No. 22160109.9; 8 pages.
Shi, "The Use of 3D-Printed Phantoms for Evaluting CT Image Quality", Dec. 1, 2019, p. 1-80, XP055945985, Retrieved from the Internet:URL:https://jscholarship.library.jhu.edu/bitstream/handle/1774.2/62312/SHI-THESIS-2019.pdf?sequence=1.

* cited by examiner

*Primary Examiner* — David P Porta
*Assistant Examiner* — Mamadou Faye
(74) *Attorney, Agent, or Firm* — Maier & Maier, PLLC

(57) ABSTRACT

A CT-device evaluation phantom to be placed between a light source for emitting a probe light and a two-dimensional detector when in use, including a ring-shaped supporting base and three or more absorbing objects whose transmittance to the probe light is equal to or lower than that of the supporting base. The CT-device evaluation phantom has a sufficient level of mechanical strength regardless of its size, and is also easy to create.

5 Claims, 3 Drawing Sheets

PHANTOM FOR EVALUATING CT DEVICE

TECHNICAL FIELD

The present invention relates to a phantom for evaluating a computed tomography (CT) device. This type of phantom is hereinafter called the "CT-device evaluation phantom".

BACKGROUND

An X-ray CT device has been known as a device for observing the internal structure of a specimen in a non-destructive manner. In an X-ray CT device, a specimen is placed on a turntable located between an X-ray source and a two-dimensional X-ray detector. An X-ray transmission image of the specimen is taken under each of a plurality of conditions with different angles of rotation of the turntable. The X-ray transmission images thus taken are reconstructed into three-dimensional data of the specimen.

A device called an "evaluation phantom" is used for evaluating the accuracy of the three-dimensional data obtained with an X-ray CT device. Patent Literature 1 discloses an evaluation phantom in which a number of supporting rods of various lengths are vertically fixed on a base, with each supporting rod having a sphere fixed to its distal end. The spheres are made of resin, aluminum, iron, ceramic or other appropriate materials. The material used for the supporting rods is either the same material as used for the spheres, or a material having a higher level of X-ray transmittance than the spheres, such as carbon. When the same material is used for both the spheres and the supporting rods, it will be easy to recognize the effect of expansion and contraction on the X-ray image caused by a temperature change. When a material having a higher level of X-ray transmittance than the spheres is used, it will be easy to locate the spheres in the X-ray transmission image since the shadows of the supporting rods become fainter.

Before an evaluation phantom is used, the shape and position of each sphere are measured in advance. Then, the evaluation phantom is placed on the turntable, and its X-ray transmission image is taken under each of a plurality of conditions with different angles of rotation of the turntable. The X-ray transmission images thus taken are reconstructed into three-dimensional data. The diameter and sphericity of each sphere as well as the distance between the spheres in the obtained three-dimensional data are compared with the actual values to ultimately evaluate the accuracy of the three-dimensional data obtained with the X-ray CT device. For the evaluation of the accuracy of the three-dimensional data, for example, the German national guideline VDI/VDE2630-1.3 is used, which specifies the accuracy of the inter-spherical distance which relates to the distance between the spheres as well as an index called a "probing error" which relates to the diameter and sphericity of the sphere.

CITATION LIST

Patent Literature

Patent Literature 1: WO 2018/193800 A

SUMMARY

The targets of the examination using an X-ray CT device considerably vary in size. For an extremely small specimen, it is necessary to acquire three-dimensional data of a zoomed-in image. In the X-ray CT device, three-dimensional data of a zoomed-in image of the specimen is obtained by placing the specimen at a close position to the X-ray source within the space between the X-ray source and the two-dimensional X-ray detector.

In order to evaluate the accuracy of the three-dimensional data of a zoomed-in image of an extremely small specimen, it is necessary to perform the evaluation using an evaluation phantom which is as small as the specimen. Specifically, for example, it is necessary to prepare an evaluation phantom in which a large number of supporting rods are vertically fixed on a small base having a diameter of 2 cm, with each supporting rod having a sphere of a few mm in diameter fixed to its distal end. However, it is not easy to fix a small sphere to each of the thin supporting rods and then vertically fix those rods on the small base. Additionally, each supporting rod must be thin, which makes those rods fragile and easy to be damaged.

The problem to be solved by the present invention is to provide a CT-device evaluation phantom which has a sufficient level of mechanical strength regardless of its size, and which is also easy to create.

The present invention developed for solving the previously described problem is a CT-device evaluation phantom to be placed between an X-ray source and a detector when in use, including:
 a supporting base shaped like a flat ring and having a top surface on which an absorbing-object placement portion is provided; and
 three or more absorbing objects placed on the absorbing-object placement portion.

The CT-device evaluation phantom according to the present invention can be easily created by simply placing each of the three or more absorbing objects on the absorbing-object placement portion provided on the supporting base. Since it is unnecessary to attach an absorbing object to each of the thin supporting rods and then vertically fix those rods, the creating task can be easily performed even when the evaluation phantom to be created is small and the absorbing objects to be used are also small Since no supporting rod is used, the problem that the evaluation phantom is easily damaged due to the use of a thin supporting rod does not occur even when the evaluation phantom is small in size. Thus, a sufficient level of strength can be ensured.

DETAILED DESCRIPTION

An embodiment of the CT-device evaluation phantom according to the present invention is hereinafter described with reference to the drawings. The CT-device evaluation phantom according to the present embodiment is used in an X-ray-CT-device evaluation system 100 used for evaluating the accuracy of the three-dimensional data of a specimen obtained with an X-ray CT device.

Figure 1:
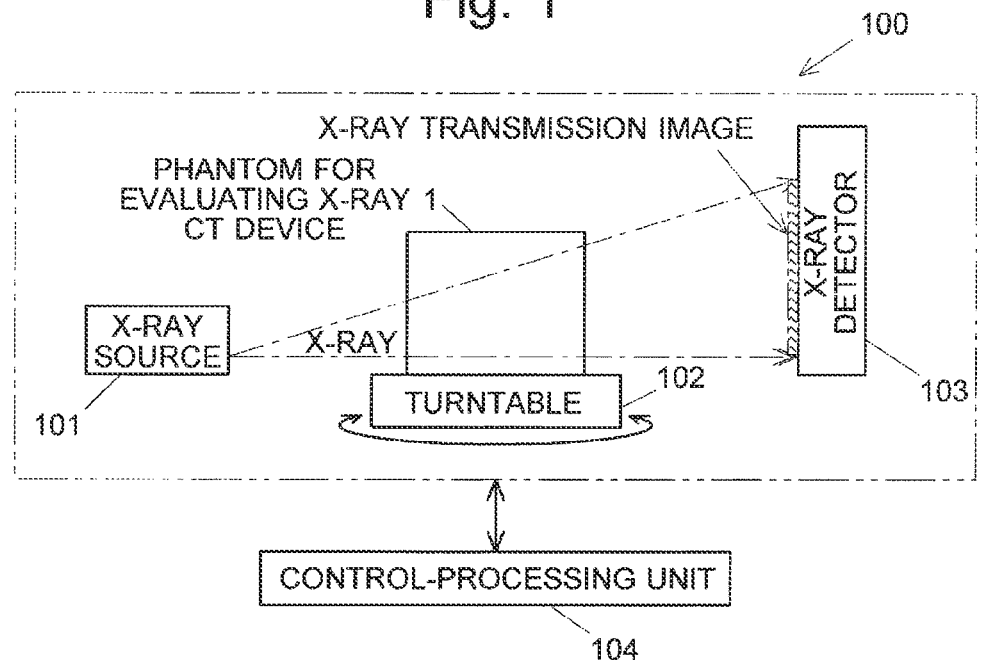
FIG. 1 is a schematic configuration diagram of an X-ray-CT-device evaluation system which is one example of the CT-device evaluation system in which a CT-device evaluation phantom according to each embodiment of the present invention is used.

As shown in FIG. 1, the X-ray-CT-device evaluation system 100 includes, in addition to the CT-device evaluation phantom 1, an X-ray light source 101, turntable 102, two-dimensional X-ray detector 103, and control-processing unit 104 configured to control the operations of the previously mentioned components. The CT-device evaluation phantom 1 is placed on the turntable 102 either directly or via a pillar or pedestal.

Before an evaluation of an X-ray CT device is performed, a plurality of angles of rotation of the turntable 102 are specified. In the evaluation process, the turntable 102 is rotated to each of those angles of rotation in a stepwise manner, and an X-ray beam is cast from the X-ray light source 101 onto the CT-device evaluation phantom 1 at each angle of rotation. The X-ray transmitted through the CT-device evaluation phantom 1 is detected with the two-dimensional X-ray detector 103. Output signals from the two-dimensional X-ray detector 103 are sent to the control-processing unit 104, in which a two-dimensional transmission image is obtained. After two-dimensional transmission images have been obtained at all of the plurality of angles of rotation, the control-processing unit 104 creates three-dimensional data of the CT-device evaluation phantom 1 by reconstructing those two-dimensional transmission images.

Specific embodiments of the CT-device evaluation phantom according to the present invention are hereinafter described. It should be noted that the sizes of the members constituting the CT-device evaluation phantom in the hereinafter mentioned drawings are appropriately altered so that the members in each embodiment can be easily recognized.

Figure 2:
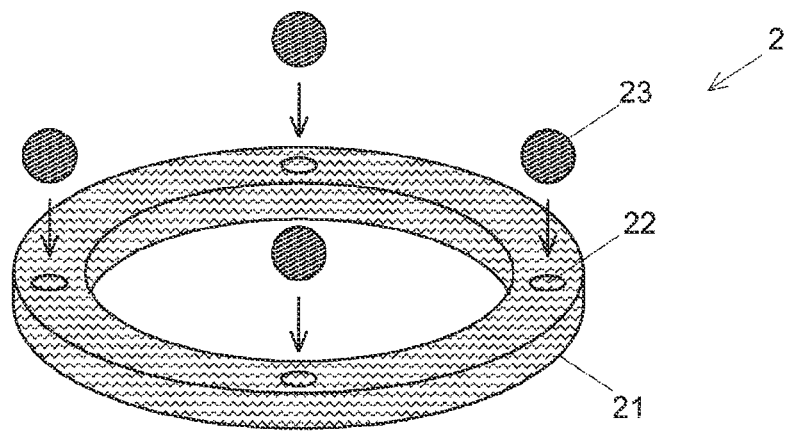
FIG. 2 is a configuration diagram of a CT-device evaluation phantom according to the first embodiment.
Figure 3:
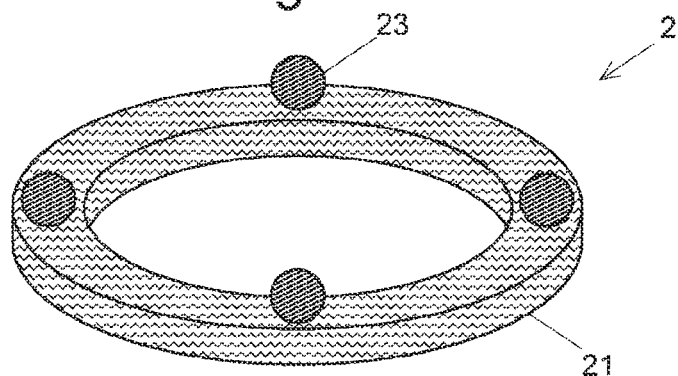
FIG. 3 is a configuration diagram of the CT-device evaluation phantom according to the first embodiment.

FIGS. 2 and 3 show the configuration of a CT-device evaluation phantom 2 according to the first embodiment. The CT-device evaluation phantom 2 includes a supporting base 21 shaped like a flat ring, four depressions 22 (absorbing-object placement portion) provided on the top surface of the supporting base 21, and absorbing objects 23 having a spherical shape and respectively placed on the four depressions 22. The supporting base 21 has an annular shape. In FIG. 2, the absorbing objects 23 are separated from the supporting base 21 so as to show the position of the depressions 22. It should be noted that those depressions will not be explicitly shown in the drawings of the CT-device evaluation phantoms according to the second and subsequent embodiments. Although there are four depressions 22 in the first embodiment, the number of depressions 22 can be appropriately changed. For example, it is possible to form a single annular depression and place the four absorbing objects 23 in this annular depression. Similarly, although there are four absorbing objects 23 in the first embodiment, there is no limitation on the number of absorbing objects 23 as long as it is equal to or greater than three. Although all depressions 22 in FIGS. 2 and 3 are occupied by the absorbing objects 23, it is possible to leave one or more depressions 23 with no absorbing object 23 placed. These notes similarly apply to the CT-device evaluation phantoms according to the second and subsequent embodiments. In the case where the number of absorbing objects 23 to be arranged in the depressions 22 is fixed, the absorbing objects 23 may be adhered to the depressions 22. The form of the absorbing-object placement portion is not limited to a depression; it may be any structure on or in which the absorbing objects can be placed.

As the supporting base 21, for example, a member measuring 1-2 mm in thickness and 10-30 mm in outer diameter (the diameter of the outer circumference) is used. The depression 22 is a hollow formed on the top surface of the supporting base 21 or a through-hole penetrating the supporting base 21 in the thickness direction, on which the spherical absorbing object 23 can be set in a stable manner, with its bottom portion supported. As the absorbing object 23, for example, a spherical body made of metal (e.g., aluminum or iron), ceramic (e.g., silicon nitride) or resin is used. There is no specific limitation on the diameter of the absorbing object 23; e.g., it may be 1-4 mm Thus, the supporting base 21 is given a thickness which is approximately equal to or even smaller than the diameter of the absorbing object 23 under the condition that a sufficient level of mechanical strength is ensured. The supporting base 21 in the CT-device evaluation phantom 2 according to the first embodiment is a member created by cutting out a circular plate from a mass of aluminum, boring a central hole through the plate, and forming the depressions on its top surface. It should be noted that the previously presented sizes are mere examples applicable in the case where the CT-device evaluation phantom 1 is placed close to the X-ray light source 101 so as to obtain a transmission image with a high enlargement ratio. The sizes should be appropriately changed according to the size and enlargement ratio of the X-ray transmission image to be obtained. For example, a conventionally used CT-device evaluation phantom has an outer diameter of 8-10 cm. The CT-device evaluation phantom according to the present embodiment may also be created to be comparable in size to this conventional example or even larger than that, if necessary.

For a component other than the absorbing object 23 (in the CT-device evaluation phantom 2 according to the first embodiment, the supporting base 21), a member made of the same material as the absorbing object 23, or a member made of a material having a higher X-ray transmittance than the absorbing object 23 (e.g., carbon), is used. When the same material is used for both the supporting base 21 and the absorbing object 23, it will be easy to deal with the expansion and contraction caused by a temperature change. When a material having a higher level of X-ray transmittance than the absorbing object 23 is used for the supporting base 21, it will be easy to recognize the position and shape of the absorbing objects 23 since the shadows of the supporting bases 21 in the X-ray transmission image become fainter. The previous descriptions concerning the selection of the materials for making the absorbing object 23 and other members similarly apply to the CT-device evaluation phantoms according to the second and subsequent embodiments.

Figure 4:
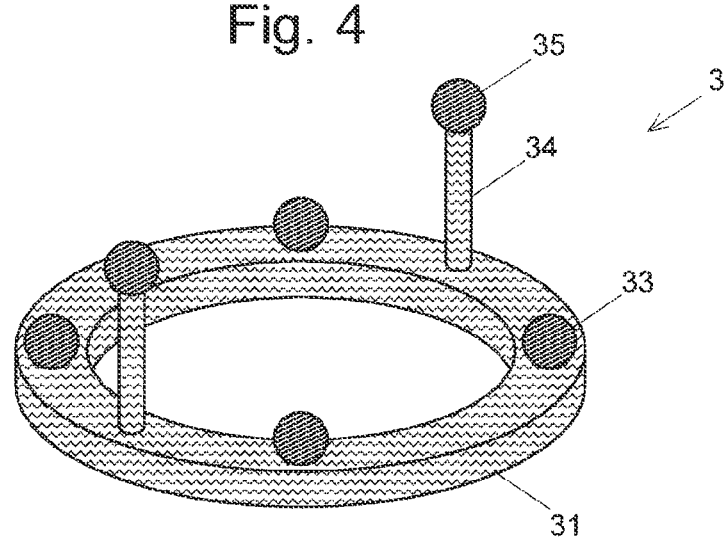
FIG. 4 is a configuration diagram of a CT-device evaluation phantom according to the second embodiment.

FIG. 4 shows a CT-device evaluation phantom 3 according to the second embodiment. This CT-device evaluation phantom 3 includes a supporting base 31 shaped like a flat ring, depressions (not shown) provided on the top surface of the supporting base 31, first absorbing objects 33 having a spherical shape and placed on the depressions, two rod members 34 having the same length and standing on the top surface of the supporting base 31, as well as second absorbing objects 35 having a spherical shape and fixed to the distal ends of the two rod members 34, respectively. The CT-device evaluation phantom 3 according to the second embodiment corresponds to the CT-device evaluation phantom 2 according to the first embodiment to which the rod members 34 and the second absorbing objects 35 are added. Although the two rod members 34 shown in FIG. 4 are identical in length, the two rod members 34 may actually have different lengths. Although there are two sets of rod members 34 and second absorbing objects 35 in FIG. 4, the number of sets may actually be one, three or more.

In the CT-device evaluation phantom 3 according to the second embodiment, the absorbing objects (the first and second absorbing objects 33 and 35) are arranged in a three-dimensional form by arranging the second absorbing objects 35 at the distal ends of the rod members 34 standing on the supporting base 31. Accordingly, by using the CT-device evaluation phantom 3 according to the second embodiment, the accuracy of the three-dimensional data of a specimen placed on the turntable 102 can be evaluated at a plurality of positions located at different heights in the vertical direction.

Figure 5:
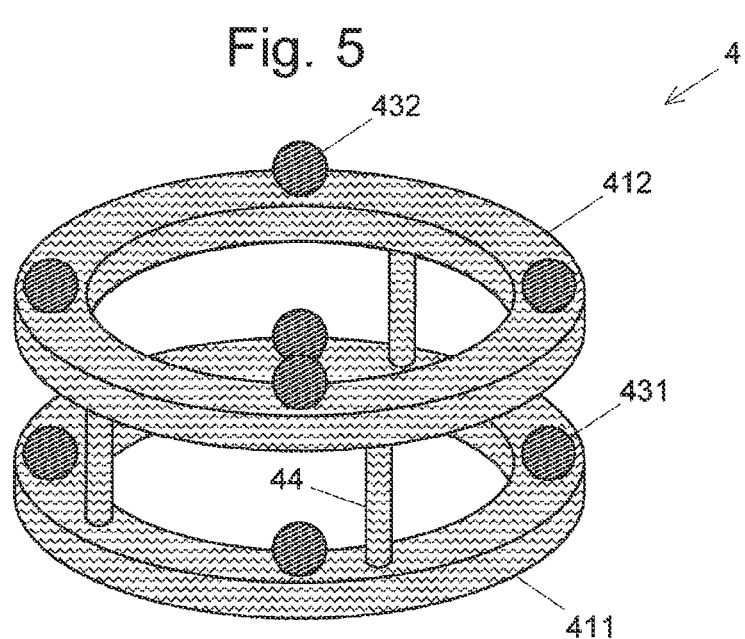
FIG. 5 is a configuration diagram of a CT-device evaluation phantom according to the third embodiment.

FIG. 5 shows a CT-device evaluation phantom 4 according to the third embodiment. This CT-device evaluation phantom 4 includes a first supporting base 411 shaped like a flat ring, depressions (not shown) provided on the top surface of the first supporting base 411, first absorbing objects 431 having a spherical shape and placed on these depressions, three rod members 44 having the same length and standing on the top surface of the first supporting base 411, a second supporting base 412 mounted on the three rod members 44, depressions (not shown) provided on the top surface of the second supporting base 412, and second absorbing objects 432 having a spherical shape and placed on these depressions. The CT-device evaluation phantom 4 according to the third embodiment corresponds to two CT-device evaluation phantoms 2 according to the first embodiment arranged in a vertically stacked form with the three rod members 44 in between. The number of rod members 44 may be two, four or more. However, it is preferable to arrange three rod members 44 at equal intervals in the circumferential direction since this arrangement can support the second supporting base 412 in a stable manner with the minimum number of rod members.

In the CT-device evaluation phantom 4 according to the third embodiment, as in the CT-device evaluation phantom 3 according to the second embodiment, the absorbing objects (the first and second absorbing objects 431 and 432) are arranged in a three-dimensional form by arranging the first absorbing objects 431 on the first supporting base 411 and the second absorbing objects 432 on the second supporting base 412. Accordingly, the accuracy of the three-dimensional data of a specimen placed on the turntable 102 can be evaluated at a plurality of positions located at different heights in the vertical direction.

In the CT-device evaluation phantom 3 according to the second embodiment, one rod member 34 is provided for each of the second absorbing objects 35. By comparison, in the CT-device evaluation phantom 4 according to the third embodiment, once the three rod members 44 with the second supporting base 412 are arranged, a large number of second absorbing objects 432 can be placed on the supporting base 412. Accordingly, for example, when it is necessary to arrange three or fewer second absorbing objects at the same height in the vertical direction, it is preferable to use the CT-device evaluation phantom 3 according to the second embodiment, whereas it is preferable to use the CT-device evaluation phantom 4 according to the third embodiment when it is necessary to arrange four or more second absorbing objects at the same height in the vertical direction. In this manner, the required number of second absorbing objects can be arranged with the smallest possible number of members forming the CT-device evaluation phantom. Additionally, the CT-device evaluation phantom 4 according to the third embodiment allows a plurality of absorbing objects to be arranged at a plurality of positions which only differ from each other in height in the vertical direction (at the same location in a plan view).

Figure 6:
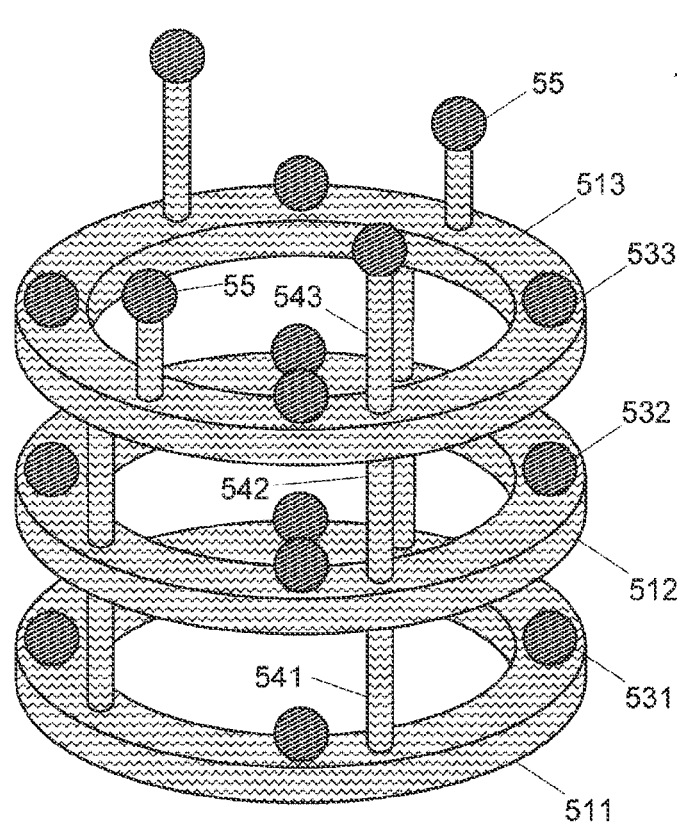
FIG. 6 is a configuration diagram of a CT-device evaluation phantom according to the fourth embodiment.

FIG. 6 shows a CT-device evaluation phantom 5 according to the fourth embodiment. This CT-device evaluation phantom 5 has a total of three layers which includes the CT-device evaluation phantom 4 according to the third embodiment, with the CT-device evaluation phantom 2 according to the first embodiment additionally mounted. This CT-device evaluation phantom 5 includes a first supporting base 511 shaped like a flat ring, depressions (not shown) provided on the top surface of the first supporting base 511, first absorbing objects 531 having a spherical shape and placed on these depressions, three first rod members 541 having the same length and standing on the top surface of the first supporting base 511, a second supporting base 512 mounted on the three first rod members 541, depressions (not shown) provided on the top surface of the second supporting base 512, second absorbing objects 532 having a spherical shape and placed on these depressions, three second rod members 542 having the same length and standing on the top surface of the second supporting base 512, a third supporting base 513 mounted on the three second rod members 542, depressions (not shown) provided on the top surface of the third supporting base 513, and third absorbing objects 533 having a spherical shape and placed on these depressions. It further includes pairs of rod members 543 on the third supporting base 513, with each pair consisting of two rod members having different lengths, as well as fourth absorbing objects 55 having a spherical shape and fixed to the distal ends of the rod members 543, respectively. Although the fourth embodiment is a three-layered structure in which the absorbing objects are arranged at three different heights in the vertical direction, the number of layers may be increased to four or more. Rod members shorter than the first or second rod members 541 or 542, with absorbing objects fixed to their distal ends, may additionally be arranged on the first or second supporting base 511 or 512.

Figure 7:
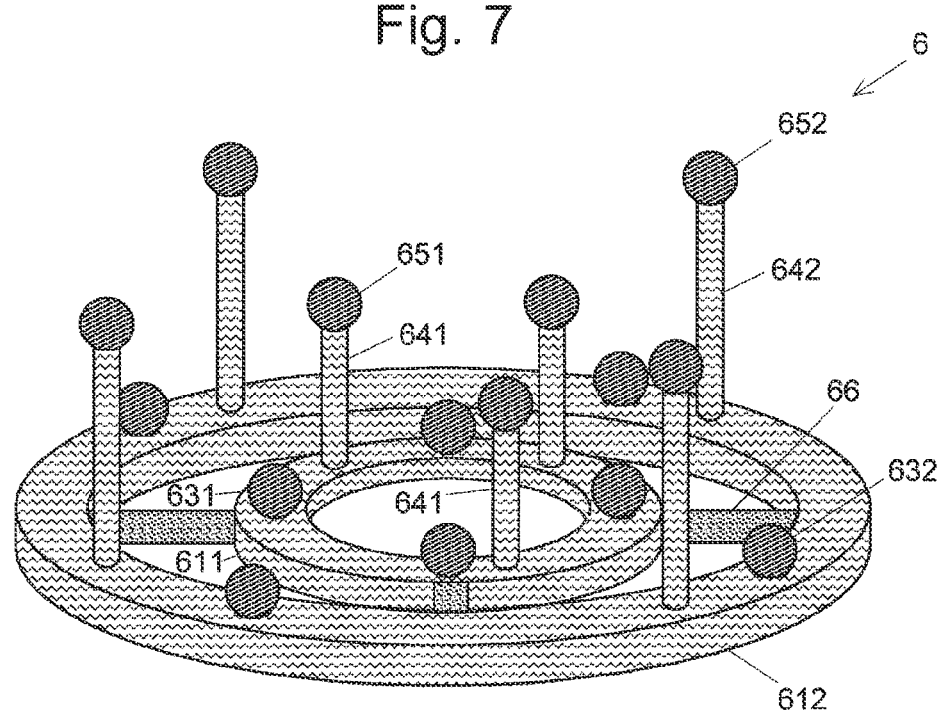
FIG. 7 is a configuration diagram of a CT-device evaluation phantom according to the fifth embodiment.

FIG. 7 shows a CT-device evaluation phantom 6 according to the fifth embodiment. This CT-device evaluation phantom 6 includes a first supporting base 611 shaped like a flat ring, depressions (not shown) provided on the top surface of the first supporting base 611, first absorbing objects 631 having a spherical shape and placed on these depressions, three first rod members 641 standing on the top surface of the first supporting base 611, and second absorbing objects 651 having a spherical shape and fixed to the distal ends of the three first rod members 641, respectively. It further includes a second supporting base 612 shaped like a flat ring having a larger diameter than the first supporting base 611, depressions (not shown) provided on the top surface of the second supporting base 612, third absorbing objects 632 having a spherical shape and placed on these depressions, four second rod members 642 standing on the top surface of the second supporting base 612, and fourth absorbing objects 652 having a spherical shape and fixed to the distal ends of the four second rod members 642, respectively. The first and second supporting bases 611 and 612 are connected to each other by connecting members 66.

In short, the CT-device evaluation phantom 6 according to the fifth embodiment is a combination of two CT-device evaluation phantoms 3 according to the second embodiment in which two supporting bases having different diameters (i.e., the first and second supporting bases 611 and 612) are respectively used. The CT-device evaluation phantom 6 according to the fifth embodiment allows absorbing objects to be arranged at different positions in the radial direction.

The previously described embodiments are mere examples and can be appropriately changed or modified along the gist of the present invention. The numbers of supporting bases, absorbing objects, rod members and other components used in the previously described embodiments are mere examples and can be appropriately increased or decreased. In the previously described embodiments, the absorbing objects are made of the same material, and other members are also made of the same material. It is also possible to use a different material for each member, or to use a different material for each absorbing object.

The fourth and fifth embodiments demonstrated examples of the combinations of the elementary techniques presented in the first through third embodiments. It is possible to appropriately change the way in which the elementary techniques are combined, as well as the number of elementary techniques to be combined.

In any of the previously described embodiments, a supporting base shaped like a flat ring is used. Although this is a preferable shape, the support base is not limited to this shape. For example, a supporting base shaped like a disc (with no blank portion) or flat polygonal plate may be used. Similarly, in any of the previously described embodiments, an absorbing object having a spherical shape is used, which is also a preferable shape. The absorbing object is not limited to the spherical shape; for example, an absorbing object having a cubic or polygonal shape may also be used.

In any of the previously described embodiments, an absorbing object whose diameter is larger than that of the upper end of the hollow or through-hole forming the depression is used so that the lower portion of the absorbing object is supported by the top surface of the depression. The depression is not limited to this type of form. For example, in the case where a supporting base having an extremely high transmittance to the probe light is available, the depression may be configured to receive the entire absorbing object. For example, this can be achieved by a depression in the form of a hollow having a larger diameter than the absorbing object, or a depression in the form of a tapered through-hole whose diameter at the upper end is larger than that of the absorbing object while its diameter at the lower end is smaller than that of the absorbing object.

The previously described embodiments are concerned with a CT-device evaluation phantom to be used in an X-ray-CT-device evaluation system 100. Configurations similar to the previously described embodiments can also be adopted in a system for evaluating a CT device which acquires three-dimensional data of a specimen by irradiating the specimen with a probe light which is not an X-ray beam. In the case of a CT-device evaluation phantom to be used for evaluating a CT device which irradiates a specimen with a probe light which is not an X-ray beam, it is preferable to appropriately select the materials for the absorbing objects and other components (e.g., supporting bases) taking into account the light transmittance of each material to the light having the wavelength of the probe light.

[Modes]

A person skilled in the art can understand that the previously described illustrative embodiments are specific examples of the following modes of the present invention.

(Clause 1)

One mode of the present invention is a CT-device evaluation phantom to be placed between an X-ray source and a detector when in use, including:
  a supporting base shaped like a flat ring and having a top surface on which an absorbing-object placement portion is provided; and
  three or more absorbing objects placed on the absorbing-object placement portion.

The CT-device evaluation phantom according to Clause 1 can be easily created by simply placing each of the three or more absorbing objects on the absorbing-object placement portion provided on the supporting base. Since it is unnecessary to attach an absorbing object to each of the thin supporting rods and then vertically fix those rods, the creating task can be easily performed even when the evaluation phantom to be created is small and the absorbing objects to be used are also small Since no supporting rod is used, the problem that the evaluation phantom is easily damaged due to the use of a thin supporting rod does not occur even when the evaluation phantom is small in size. Thus, a sufficient level of strength can be ensured. Furthermore, since the supporting base is shaped like a flat ring which has no X-ray-absorbing/scattering portion at its center, a clear transmission image is likely to be obtained. The flat-ring shape also has the effect of reducing an increase in the optical length of the transmission path regardless of the thickness of the ring.

(Clause 2)

In the CT-device evaluation phantom described in Clause 1, the absorbing-object placement portion may be a depression.

The CT-device evaluation phantom described in Clause 2 can provide a more stable placement of the absorbing object.

(Clause 3)

In the CT-device evaluation phantom described in Clause 1 or 2, the thickness of the supporting base may be smaller than the size of the absorbing object.

In the CT-device evaluation phantom described in Clause 3, the use of the supporting base whose thickness is smaller than the size of the absorbing object makes the shadow of the supporting base less visible in the resulting transmission image. The use of the thin supporting base also contributes to the weight saving of the CT-device evaluation phantom. In the case of boring a through-hole as the depression, the use of the thin supporting base facilitates the machining work. The "size" of the absorbing object can be defined as the diameter in the case of a spherical absorbing object, or as the vertical length of the object placed on or in the depression in the case of other types of shape.

(Clause 4)

The CT-device evaluation phantom described in one of Clauses 1-3 may further include:
  a plurality of pillars standing on the supporting base;
  a second supporting base mounted on the plurality of pillars and having a top surface on which an absorbing-object placement portion is provided; and
  a second absorbing object placed on the absorbing-object placement portion of the second supporting base.

(Clause 5)

The CT-device evaluation phantom described in one of Clauses 1-4 may further include:
  a rod member standing on the supporting base; and
  a third absorbing object arranged at the distal end of the rod member.

In the CT-device evaluation phantom described in Clause 4 or 5, the absorbing objects are three-dimensionally arranged at different heights. Therefore, by using any of these CT-device evaluation phantoms, the accuracy of the three-dimensional data obtained with a CT device can be evaluated at a plurality of positions located at different heights.

REFERENCE SIGNS LIST 1-6 . . . CT-Device Evaluation Phantom
21, 31, 411, 412, 511, 512, 513, 611, 612 . . . Supporting Base
22 . . . Depression
23, 33, 35, 431, 432, 531, 532, 533, 55, 631, 632, 651, 652 . . . Absorbing Object
66 . . . Connecting Member
100 . . . X-Ray-CT-Device Evaluation System
101 . . . X-Ray Light Source
102 . . . Turntable
103 . . . Two-Dimensional X-Ray Detector
104 . . . Control-Processing Unit

The invention claimed is:

1. A CT-device evaluation phantom to be placed between an X-ray source and a detector when in use, comprising:
    a supporting base plate having a top surface on which an absorbing-object placement portion is provided; and
    at least three absorbing objects arranged on or above the top surface and located by the absorbing-object placement portion.

2. The CT-device evaluation phantom according to claim 1, wherein the absorbing-object placement portion is a depression in the top surface.

3. The CT-device evaluation phantom according to claim 1, wherein a thickness of the supporting base plate is smaller than a maximum dimension of one or more of the at least three absorbing objects.

4. The CT-device evaluation phantom according to claim 1, further comprising:
    a plurality of pillars standing on the supporting base plate;
    a second supporting base plate mounted on the plurality of pillars and having a second top surface on which a second absorbing-object placement portion is provided; and
    at least one second absorbing object arranged on or above the second top surface and located by the second absorbing-object placement portion.

5. The CT-device evaluation phantom according to claim 1, further comprising:
    a rod member standing on the supporting base plate; and
    a third absorbing object arranged at a distal end of the rod member.

* * * * *